(12) United States Patent
Zhang et al.

(10) Patent No.: US 11,894,612 B2
(45) Date of Patent: Feb. 6, 2024

(54) ANTENNA ARRAY HAVING A CURVED CONFIGURATION

(71) Applicant: QUALCOMM Incorporated, San Diego, CA (US)

(72) Inventors: Danlu Zhang, San Diego, CA (US); Yehonatan Dallal, Kfar Saba (IL); Shay Landis, Hod Hasharon (IL); Sang Tran, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/652,618

(22) Filed: Feb. 25, 2022

(65) Prior Publication Data

US 2023/0275357 A1    Aug. 31, 2023

(51) Int. Cl.
   *H01Q 15/16*    (2006.01)
   *H01Q 19/06*    (2006.01)
   *H01Q 21/00*    (2006.01)

(52) U.S. Cl.
   CPC ............. *H01Q 15/16* (2013.01); *H01Q 19/06* (2013.01); *H01Q 21/0031* (2013.01)

(58) Field of Classification Search
   CPC .... H01Q 21/00; H01Q 21/0031; H01Q 21/06; H01Q 15/02; H01Q 15/08; H01Q 15/16; H01Q 19/06
   See application file for complete search history.

(56) References Cited

U.S. PATENT DOCUMENTS

| | | | | |
|---|---|---|---|---|
| 4,348,678 A | * | 9/1982 | Thomas | H01Q 25/008 342/368 |
| 4,872,019 A | * | 10/1989 | Chow | H01Q 15/08 343/753 |
| 9,203,149 B2 | * | 12/2015 | Henderson | H01Q 19/062 |
| 10,230,166 B2 | * | 3/2019 | Savage | H01Q 19/06 |
| 10,326,203 B1 | * | 6/2019 | Black | H01Q 19/062 |
| 11,139,583 B2 | * | 10/2021 | Hu | H01Q 1/246 |
| 11,171,425 B2 | * | 11/2021 | Walker | H01Q 21/061 |
| 2017/0062944 A1 | | 3/2017 | Zimmerman et al. | |
| 2019/0181926 A1 | | 6/2019 | Liang et al. | |

FOREIGN PATENT DOCUMENTS

EP    3242358 A1    11/2017
JP    2004255331 A  * 9/2004

OTHER PUBLICATIONS

International Search Report and Written Opinion—PCT/US2023/061366—ISA/EPO—dated Apr. 18, 2023.

* cited by examiner

*Primary Examiner* — Tho G Phan
(74) *Attorney, Agent, or Firm* — QUALCOMM Incorporated

(57) ABSTRACT

Various aspects of the present disclosure generally relate to wireless communication. In some aspects, a first network node may transmit a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens. The first network node may transmit a second signal using a second antenna of the plurality of antennas, wherein the second antenna is located at a second position on the curved structure so that the second signal has a second aperture with respect to the lens. Numerous other aspects are described.

30 Claims, 8 Drawing Sheets

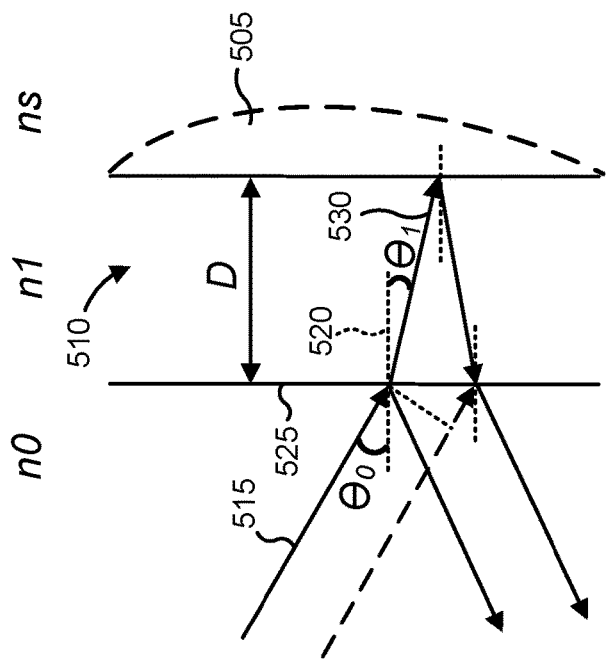

600

610 — Transmit a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens, wherein the first signal comprises a first millimeter wave signal or a first sub-Terahertz signal

620 — Transmit a second signal using a second antenna of the plurality of antennas, wherein the second antenna is located at a second position on the curved structure so that the second signal has a second aperture with respect to the lens, wherein the second signal comprises a second millimeter wave signal or a second sub-Terahertz signal

FIG. 6

ANTENNA ARRAY HAVING A CURVED CONFIGURATION

FIELD OF THE DISCLOSURE

Aspects of the present disclosure generally relate to wireless communication and to techniques and apparatuses for an antenna array having a curved configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example associated with configuration of a depth of an anti-reflective coating applied to a lens in a radio frequency lens system, in accordance with the present disclosure.

FIGS. 6 and 7 are diagrams illustrating example processes associated with an antenna array having a curved configuration, in accordance with the present disclosure.

SUMMARY

Figure 1:
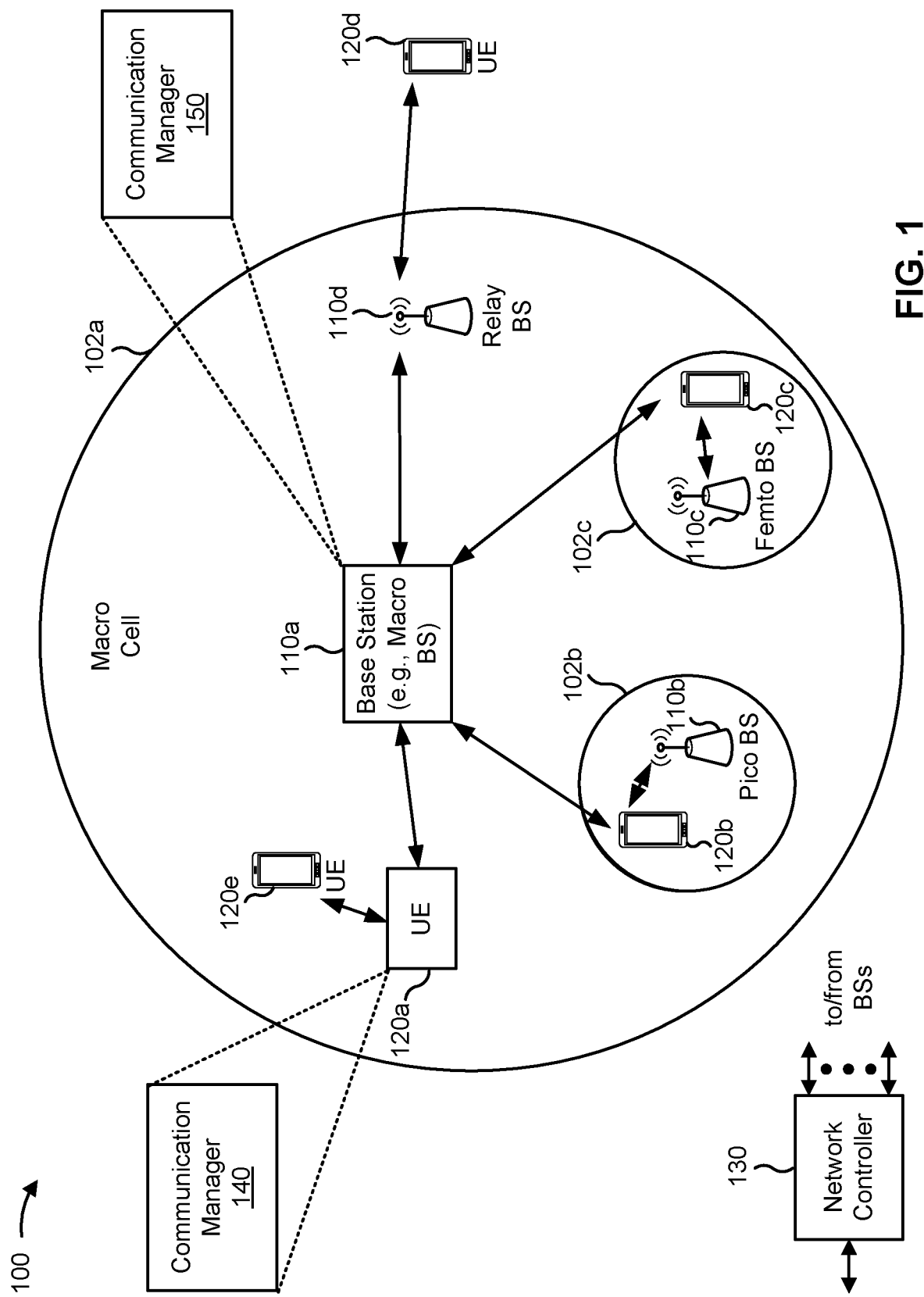
FIG. 1 is a diagram illustrating an example of a wireless network, in accordance with the present disclosure.

Some aspects described herein relate to a first network node. The first network node may include an antenna system that includes an antenna array and at least one lens. The antenna array may include a plurality of antennas that are arranged along a curved structure, wherein the curved structure is convex in a direction opposite a transmission direction. The first network node may include a memory and one or more processors coupled to the memory and the antenna system. The one or more processors may be configured to transmit a first signal using a first antenna of the antenna array, wherein the first antenna is located at a first position on the curved structure so that the first signal has a first aperture with respect to the lens, wherein the first signal comprises a first millimeter wave signal or a first sub-Terahertz signal. The one or more processors may be configured to transmit a second signal using a second antenna of the plurality of antennas, wherein the second antenna is located at a second position on the curved structure so that the second signal has a second aperture with respect to the lens, wherein the first signal comprises a first millimeter wave signal or a first sub-Terahertz signal.

Some aspects described herein relate to a first network node. The first network node may include an antenna system that includes an antenna array and at least one lens. The antenna array may include a plurality of antennas that are arranged along a curved structure, wherein the curved structure is convex in a direction opposite a reception direction. The first network node may include a memory and one or more processors coupled to the memory and the antenna system. The one or more processors may be configured to receive a first signal using a first antenna of the antenna array, wherein the first antenna is located at a first position on the curved structure so that the first signal has a first aperture with respect to the lens. The one or more processors may be configured to receive a second signal using a second antenna of the plurality of antennas, wherein the second antenna is located at a second position on the curved structure so that the second signal has a second aperture with respect to the lens. The first signal may include a millimeter signal or a sub-Terahertz signal and the second signal may include a millimeter signal or a sub-Terahertz signal.

Some aspects described herein relate to a method of wireless communication performed by a first network node having an antenna system that includes an antenna array and at least one lens. The method may include transmitting a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens. The method may include transmitting a second signal using a second antenna of the plurality of antennas, wherein the second antenna is located at a second position on the curved structure so that the second signal has a second aperture with respect to the lens. The first signal may include a millimeter signal or a sub-Terahertz signal and the second signal may include a millimeter signal or a sub-Terahertz signal.

Some aspects described herein relate to a method of wireless communication performed by a first network node having an antenna system that includes an antenna array and at least one lens. The method may include receiving a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens. The method may include receiving a second signal using a second antenna of the plurality of antennas, wherein the second antenna is located at a second position on the curved structure so that the second signal has a second aperture with respect to the lens. The first signal may include a millimeter signal or a sub-Terahertz signal and the second signal may include a millimeter signal or a sub-Terahertz signal.

Some aspects described herein relate to a non-transitory computer-readable medium that stores a set of instructions for wireless communication by a first network node having an antenna system that includes an antenna array and at least one lens. The set of instructions, when executed by one or more processors of the first network node, may cause the first network node to transmit a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens. The set of instructions, when executed by one or more processors of the first network node, may cause the first network node to transmit a second signal using a second antenna of the plurality of antennas, wherein the second antenna is located at a second position on the curved structure so that the second signal has a second aperture with respect to the lens. The first signal may include a millimeter signal or a sub-Terahertz signal and the second signal may include a millimeter signal or a sub-Terahertz signal.

Some aspects described herein relate to a non-transitory computer-readable medium that stores a set of instructions for wireless communication by a first network node having an antenna system that includes an antenna array and at least one lens. The set of instructions, when executed by one or more processors of the first network node, may cause the first network node to receive a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens. The set of instructions, when executed by one or more processors of the first network node, may cause the first network node having an antenna system that includes an antenna array and at least one lens to receive a second signal using a second antenna of the plurality of antennas, wherein the second antenna is located at a second position on the curved structure so that the second signal has a second aperture with respect to the lens. The first signal may include a millimeter signal or a sub-Terahertz signal and the second signal may include a millimeter signal or a sub-Terahertz signal.

Some aspects described herein relate to an apparatus having an antenna system that includes an antenna array and at least one lens. The apparatus may include means for transmitting a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens. The apparatus may include means for transmitting a second signal using a second antenna of the plurality of antennas, wherein the second antenna is located at a second position on the curved structure so that the second signal has a second aperture with respect to the lens. The first signal may include a millimeter signal or a sub-Terahertz signal and the second signal may include a millimeter signal or a sub-Terahertz signal.

Some aspects described herein relate to an apparatus having an antenna system that includes an antenna array and at least one lens. The apparatus may include means for receiving a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens. The apparatus may include means for receiving a second signal using a second antenna of the plurality of antennas, wherein the second antenna is located at a second position on the curved structure so that the second signal has a second aperture with respect to the lens. The first signal may include a millimeter signal or a sub-Terahertz signal and the second signal may include a millimeter signal or a sub-Terahertz signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects and examples generally include a method, apparatus, network node, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, are better understood from the following description when considered in connection with the accompanying figures. Each of the figures is provided for the purposes of illustration and description, and not as a definition of the limits of the claims.

While aspects are described in the present disclosure by illustration to some examples, such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component-based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave (mmW)" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node," a "network node," or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

In some aspects, a first network node may include a communication manager 140 or a communication manager 150. As described in more detail elsewhere herein, the communication manager 140 or 150 may transmit a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens, wherein first signal comprises a first millimeter signal or a first sub-Terahertz signal; and transmit a second signal using a second antenna of the plurality of antennas, wherein the second antenna is located at a second position on the curved structure so that the second signal has a second aperture with respect to the lens wherein second signal comprises a second millimeter signal or a second sub-Terahertz signal.

As described in more detail elsewhere herein, the communication manager 140 or 150 may receive a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens wherein first signal comprises a first millimeter signal or a first sub-Terahertz signal; and receive a second signal using a second antenna of the plurality of antennas, wherein the second antenna is located at a second position on the curved structure so that the second signal has a second aperture with respect to the lens wherein second signal comprises a second millimeter signal or a second sub-Terahertz signal. Additionally, or alternatively, the communication manager 140 or 150 may perform one or more other operations described herein.

As indicated above, FIG. 1 is provided as an example. Other examples may differ from what is described with regard to FIG. 1.

Figure 2:
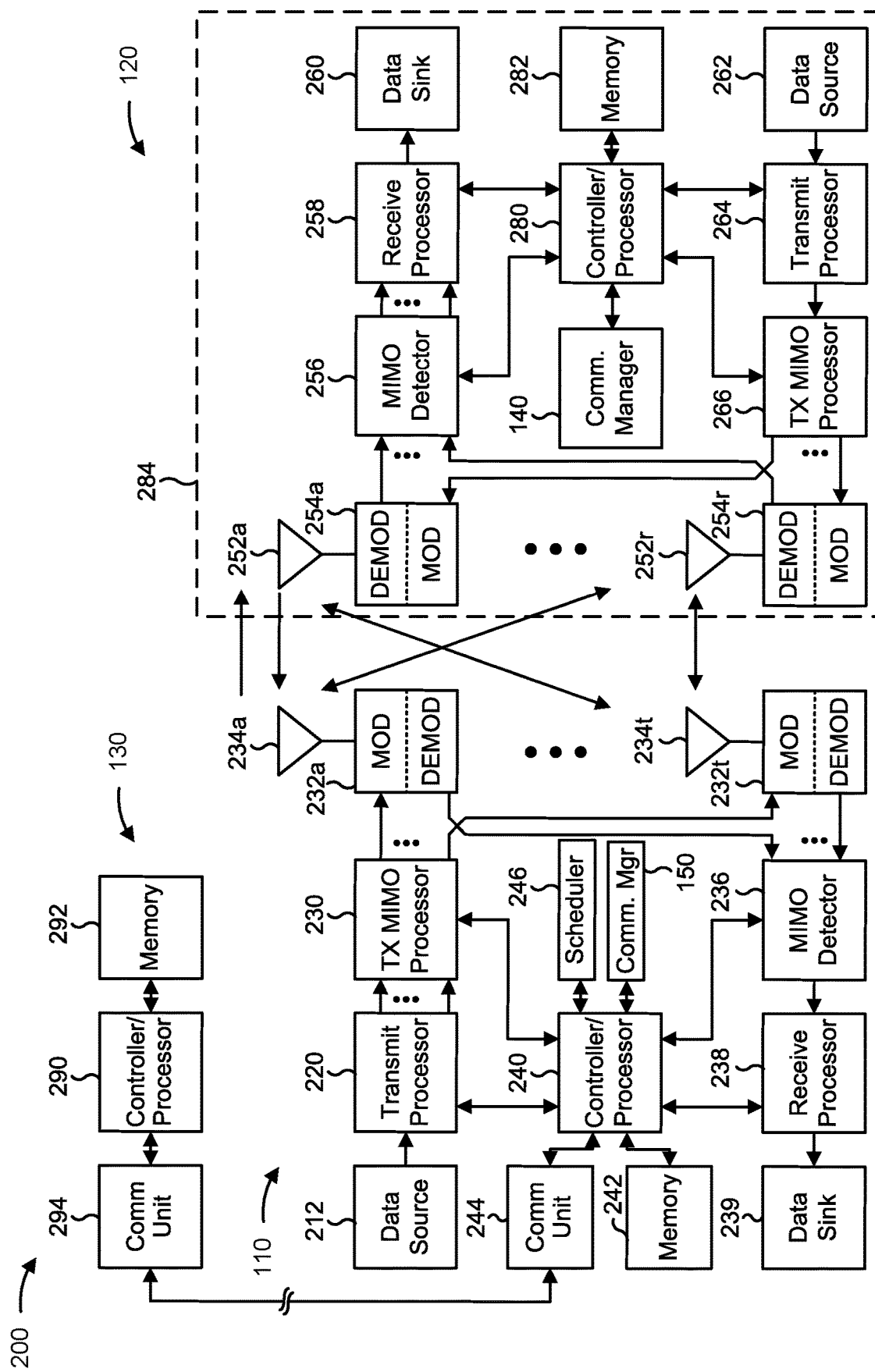
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs)

for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

Each of the antenna elements may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere (e.g., to form a desired beam). For example, given an expected range of wavelengths or frequencies, the spacing may provide a quarter wavelength, half wavelength, or other fraction of a wavelength of spacing between neighboring antenna elements to allow for interaction or interference of signals transmitted by the separate antenna elements within that expected range.

Antenna elements and/or sub-elements may be used to generate beams. "Beam" may refer to a directional transmission such as a wireless signal that is transmitted in a direction of a receiving device. A beam may include a directional signal, a direction associated with a signal, a set of directional resources associated with a signal (e.g., angle of arrival, horizontal direction, vertical direction), and/or a set of parameters that indicate one or more aspects of a directional signal, a direction associated with a signal, and/or a set of directional resources associated with a signal.

As indicated above, antenna elements and/or sub-elements may be used to generate beams. For example, antenna elements may be individually selected or deselected for transmission of a signal (or signals) by controlling an amplitude of one or more corresponding amplifiers. Beamforming includes generation of a beam using multiple signals on different antenna elements, where one or more, or all, of the multiple signals are shifted in phase relative to each other. The formed beam may carry physical or higher layer reference signals or information. As each signal of the multiple signals is radiated from a respective antenna element, the radiated signals interact, interfere (constructive and destructive interference), and amplify each other to form a resulting beam. The shape (such as the amplitude, width, and/or presence of side lobes) and the direction (such as an angle of the beam relative to a surface of an antenna array) can be dynamically controlled by modifying the phase shifts or phase offsets of the multiple signals relative to each other.

Beamforming may be used for communications between a UE and a base station, such as for millimeter wave communications and/or the like. In such a case, the base station may provide the UE with a configuration of transmission configuration indicator (TCI) states that respectively indicate beams that may be used by the UE, such as for receiving a physical downlink shared channel (PDSCH). The base station may indicate an activated TCI state to the UE, which the UE may use to select a beam for receiving the PDSCH.

A beam indication may be, or include, a TCI state information element, a beam identifier (ID), spatial relation information, a TCI state ID, a closed loop index, a panel ID, a TRP ID, and/or a sounding reference signal (SRS) set ID, among other examples. A TCI state information element (referred to as a TCI state herein) may indicate information associated with a beam such as a downlink beam. For example, the TCI state information element may indicate a TCI state identification (e.g., a tci-StateID), a quasi-co-location (QCL) type (e.g., a qcl-Type1, qcl-Type2, qcl-TypeA, qcl-TypeB, qcl-TypeC, qcl-TypeD, and/or the like), a cell identification (e.g., a ServCellIndex), a bandwidth part identification (bwp-Id), a reference signal identification such as a CSI-RS (e.g., an NZP-CSI-RS-ResourceId, an SSB-Index, and/or the like), and/or the like. Spatial relation information may similarly indicate information associated with an uplink beam.

The beam indication may be a joint or separate downlink (DL)/uplink (UL) beam indication in a unified TCI framework. In some cases, the network may support layer 1 (L1)-based beam indication using at least UE-specific (unicast) downlink control information (DCI) to indicate joint or separate DL/UL beam indications from active TCI states. In some cases, existing DCI formats 1_1 and/or 1_2 may be reused for beam indication. The network may include a support mechanism for a UE to acknowledge successful decoding of a beam indication. For example, the acknowledgment/negative acknowledgment (ACK/NACK) of the PDSCH scheduled by the DCI carrying the beam indication may be also used as an ACK for the DCI.

Beam indications may be provided for carrier aggregation (CA) scenarios. In a unified TCI framework, information the network may support common TCI state ID update and activation to provide common QCL and/or common UL transmission spatial filter or filters across a set of configured component carriers (CCs). This type of beam indication may apply to intra-band CA, as well as to joint DL/UL and separate DL/UL beam indications. The common TCI state ID may imply that one reference signal (RS) determined according to the TCI state(s) indicated by a common TCI state ID is used to provide QCL Type-D indication and to determine UL transmission spatial filters across the set of configured CCs.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-8).

The controller/processor 240 of the base station 110, the controller/processor 280 of the UE 120, and/or any other component(s) of FIG. 2 may perform one or more techniques associated with an antenna array having a curved configuration, as described in more detail elsewhere herein. In some aspects, the network node described herein is the base station 110, is included in the base station 110, or includes one or more components of the base station 110 shown in FIG. 2. In some aspects, the network node described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a first network node includes means for transmitting a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens wherein first signal comprises a first millimeter signal or a first sub-Terahertz signal; and/or means for transmitting a second signal using a second antenna of the plurality of antennas, wherein the second antenna is located at a second position on the curved structure so that the second signal has a second aperture with respect to the lens wherein second signal comprises a second millimeter signal or a second sub-Terahertz signal.

In some aspects, the first network node includes means for receiving a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens; and/or means for receiving a second signal using a second antenna of the plurality of antennas, wherein the second antenna is located at a second position on the curved structure so that the second signal has a second aperture with respect to the lens wherein second signal comprises a second millimeter signal or a second sub-Terahertz signal. In some aspects, the means for the first network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the first network node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Generally, MIMO is considered to be difficult to achieve in LOS conditions, as the complete channel matrix tends to have an effectively low rank. By using a lens or a dish antenna together with individual transmitting and receiving elements, an effective high rank channel can be obtained, even in LOS conditions, thanks to the high spatial resolution achieved by a high gain lens or dish. However, compared with typical camera or laser optical systems, a radio frequency (RF) lens system can provide unique design options. For example, lenses can be used as complicated phasors and can be configurable to achieve any number of different phase characteristics.

Figure 3:
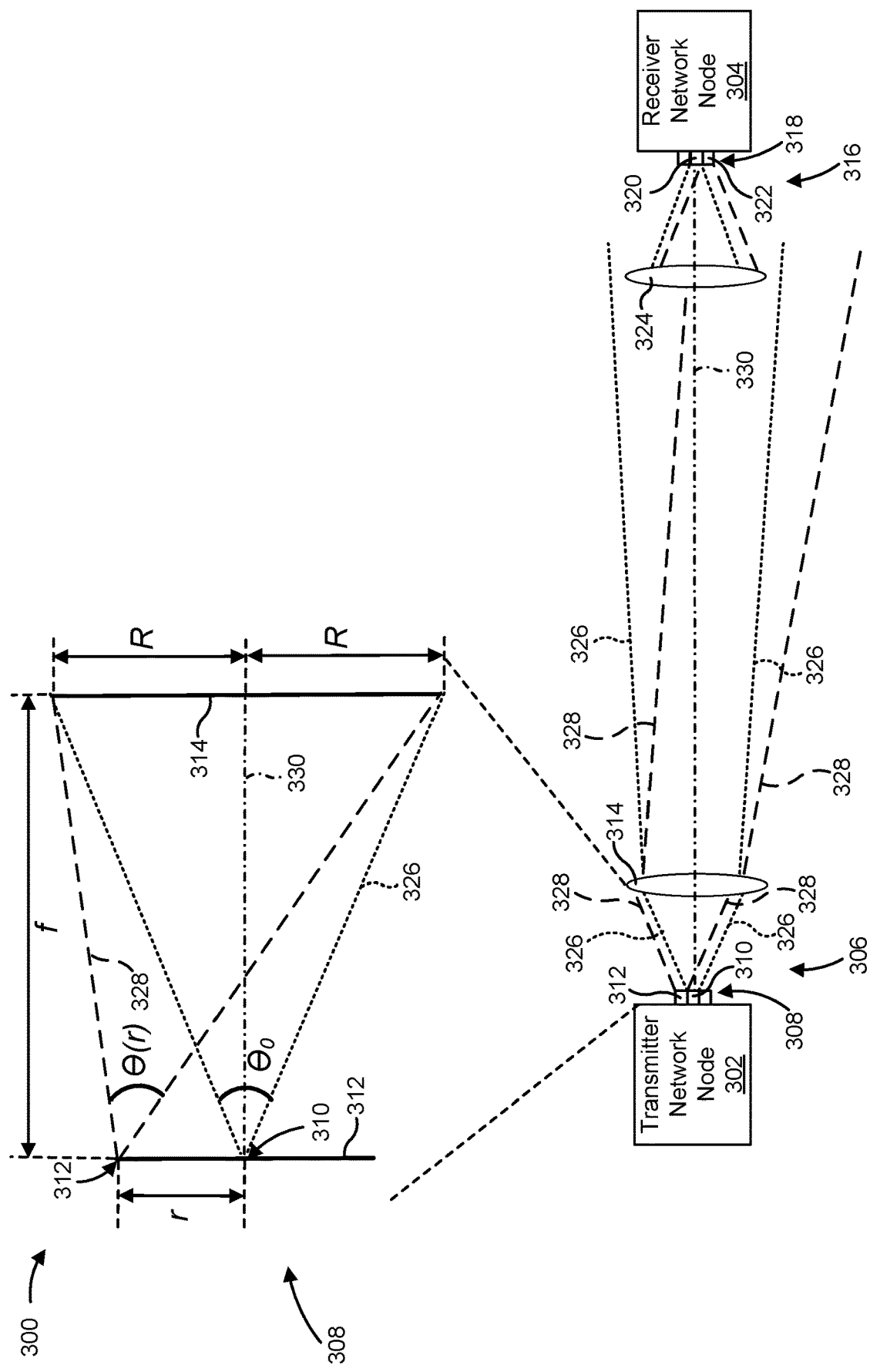
FIG. 3 is a diagram illustrating an example of line-of-sight (LOS) MIMO using RF lens systems, in accordance with the present disclosure.

FIG. 3 is a diagram illustrating an example 300 of line-of-sight (LOS) MIMO using RF lens systems, in accordance with the present disclosure. As shown, a transmitter network node 302 and a receiver network node 304 communicate with one another.

The transmitter network node 302 includes an antenna system 306. The antenna system 306 includes an antenna array 308 having a plurality of antennas (e.g., antenna elements) 310 and 312. The antenna system 306 also includes a lens 314. The antenna system 306 can be referred to as an "RF lens system." In some aspects, the antenna system 306 can include any number of antennas 310 and 312. For example, the antenna system 306 can have 4 antennas, 12 antennas, 32 antennas, or hundreds of antennas, among other examples. Similarly, although the antenna system 306 is illustrated as having one lens 314, the antenna system 306 can have any number of lenses 314.

The receiver network node 304 also includes an antenna system 316. The antenna system 316 includes an antenna array 318 having a plurality of antennas 320 and 322. The antenna system 316 also includes a lens 324. In some aspects, the antenna system 316 can include any number of antennas 320 and 322. Similarly, although the antenna system 316 is illustrated as having one lens 324, the antenna system 316 can have any number of lenses 324. In some cases, one of the antenna systems 306 and 316 can include an antenna array without a lens. The lenses 314 and 324 can be any kind of RF lens such as, for example, a dielectric lens. In some cases, for example, a dielectric lens can be made of polytetrafluoroethylene (PTFE) or similar material.

As shown in FIG. 3, the antenna 310 transmits a first signal 326, which is illustrated by an outer boundary of the wave path. The antenna 312 transmits a second signal 328, which also is illustrated by an outer boundary of the respective wave path. As shown, the signal 326 and the signal 328 overlap and, as a result, can experience a large amount of cross-talk. Fourier optics concepts can be applied to the example 300 to analyze the behavior of the signals 326 and 328.

For example, a signal 326 or 328, at the antenna system 306, can be represented as u(x,y). At the antenna system 316, the signal 326 or 328 is the image of the signal 326 or 328 at the antenna array 308. Thus, at the antenna system 316, the signal 326 or 328 can be represented as u'(x',y'):

$$u'(x',y') = u(x,y) \otimes g(x,y), \quad (1)$$

where g(x,y) is the point-spread function (PSF) in Fourier optics, which is equivalent to a δ-response or a Green function. In spatial frequency domain, $$U'(f_x', f_y') = u(f_x, \omega_y) G(f_x, f_y), \quad (2)$$

where $G(f_x, f_y)$ corresponds to the aperture function in the antenna system 306.

For a typical system, lenses with circular apertures are used, and the limiting aperture should be circular as well. In some cases, the transmitting antenna (e.g., antenna 310) is an on-axis antenna (e.g., a central axis 330 of the system that passes perpendicularly through the center of the lens 314 also passes perpendicularly through the center of an aperture of the antenna 310). The "aperture" of the antenna 310 can refer to the effective transmitting shape of the antenna 310, which can be based at least in part on the structure of the antenna (e.g., the size and shape). The size and shape of the aperture defines an initial size and shape of a wavefront of the signal 326. In the case of an on-axis antenna 310, $$G(\omega_x, \omega_y) = circ\left(\frac{f_r}{R_{lens}/\lambda F}\right) = circ\left(\frac{\sqrt{f_x^2 + f_y^2}}{R_{lens}/\lambda F}\right) = \begin{cases} 1 & \text{if } \sqrt{f_x^2 + f_y^2} \leq R_{lens}/\lambda F \\ 0 & \text{otherwise} \end{cases}, \quad (3)$$

where $R_{lens}$ is the radius of the lens aperture and F is the focal length of the lens 314.

As shown in FIG. 3, however, the antennas 310 and 312 can be arranged such that the antenna 312 is an off-axis antenna (e.g., the central axis 330 does not pass through the center of an aperture of the antenna 312). The aperture of the on-axis antenna 310, measured by angular width, is $$\theta_0 = 2\arctan\left(\frac{R}{f}\right), \quad (4)$$

where R is radius of the lens 314 and f is the focal length of the lens 314, as shown in FIG. 3. The aperture of an off-axis antenna 310, located at a distance r from the center of the antenna array 308 (and, thus from the point at which the central axis 330 perpendicularly intersects the antenna array 308), measured by angular width, is $$\theta(r) = \arctan\left(\frac{R+r}{f}\right) + \arctan\left(\frac{R-r}{f}\right), \quad (5)$$

regardless of whether r<R or r≥R. Therefore, $$\frac{d\theta(r)}{dr} = \frac{\frac{1}{f}}{1+\left(\frac{R+r}{f}\right)^2} - \frac{\frac{1}{f}}{1+\left(\frac{R-r}{f}\right)^2} = \frac{f(-4Rr)}{[f^2+(R+r)^2][f^2+(R-r)^2]} < 0, \quad (6)$$

and $\frac{d\theta(r)}{dr} < 0$, when $r \geq 0$.

Therefore, since $$\frac{d\theta(r)}{dr} < 0$$

when r≥0, an on-axis antenna 310 has a smaller aperture than an on-axis antenna 312. Transmitting LOS MIMO communications using two or more antennas having different aperture sizes can result in unnecessarily complicated analysis on the part of the receiver network node 404 in identifying the separate signals 326 and 328. The same analysis is required at the receiver network node 404 with respect to receiving multiple signals using multiple antennas 320 and 322. As a result, RF lens systems that include multiple antennas can introduce unnecessary cross-talk and complexity of analysis, thereby having a negative impact on network performance.

Some aspects of the techniques and apparatuses described herein provide RF lens antenna systems in which off-axis antennas are positioned closer to the lens than on-axis antennas. To position the off-axis antennas closer to the lens, the antennas may be arranged along a curved structure. The curved structure may be convex in a direction opposite a transmission direction (e.g., the curved structure may curve away from the lens) so that off-axis antennas are positioned closer to the lens, thereby compensating for the difference in aperture size between the antennas. The antennas may be transmission antennas and/or reception antennas. In some aspects, for example, the antennas may be placed on an inner surface of a sphere. In some aspects, an anti-reflective coating disposed on an outer surface of the lens may be adapted based on the antenna arrangement. In some aspects, aberration may be reduced by using a non-spherical lens. Accordingly, some aspects may facilitate providing multiple LOS MIMO signals having similar aperture sizes, thereby reducing unnecessary cross-talk and facilitating less complex separation analysis at the receiver. As a result, some aspects may have a positive impact on network performance.

As indicated above, FIG. 3 is provided as an example. Other examples may differ from what is described with regard to FIG. 3.

Figure 4:
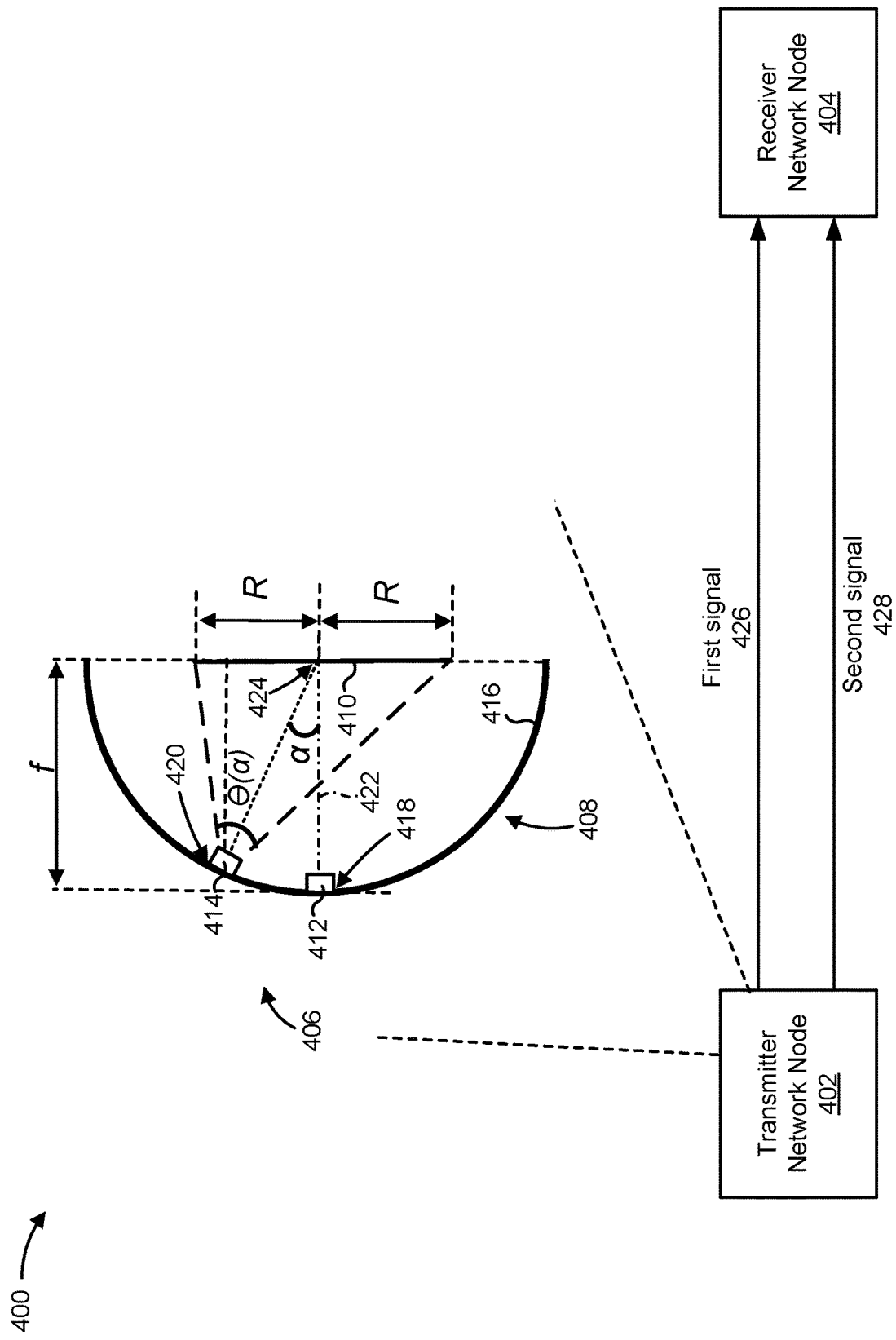
FIG. 4 is a diagram illustrating an example associated with an antenna array having a curved configuration, in accordance with the present disclosure.

FIG. 4 is a diagram illustrating an example 400 associated with an antenna array having a curved configuration. As shown, a transmitter network node 402 and a receiver network node 404 may communicate with one another.

In some aspects, the transmitter network node 402 may be, be similar to, include, or be included in, the transmitter network node 302 depicted in FIG. 3, but in which the antennas are arranged along a curved structure. For example, as shown, the transmitter network node 402 may include an antenna system 406 having an antenna array 408 and a lens 410. The antenna array may include a plurality of antennas 412 and 414 arranged along a curved structure 416. For example, the antenna 412 may be located at a first position 418 on the curved structure 416 and the antenna 414 may be located at a second position 420 on the curved structure 416. As shown, in connection with a central axis 422, the antenna 412 may be an on-axis antenna and the antenna 414 may be an off-axis antenna. The antenna 412 may have a first aperture with respect to the lens 410 and the antenna 414 may have a second aperture with respect to the lens 410. In some aspects, the second aperture may be smaller than the first aperture.

Similarly, the receiver network node 404 may be, be similar to, include, or be included in, the receiver network node 304 depicted in FIG. 3, but in which the antennas are arranged along a curved structure. For example, the receiver network node 404 may include an antenna system 406 having an antenna array 426 and a lens 428. The antenna array 426 may be similar to the antenna system 406 described in connection with the transmitter network node 402, and the concepts and principles described herein in connection with the transmitter network node 402 may apply also to the receiver network node 404.

As shown, in connection with the transmitter network node 402, the curved structure 416 may correspond to a portion of a circle having a radius f from the center 424 of the lens 410. In this case, for example, the antenna 414 may have an aperture, $\theta(\alpha)$, defined by:

$$\theta(\alpha) = \arctan\left(\frac{R + f\sin\alpha}{f\cos\alpha}\right) + \arctan\left(\frac{R - f\sin\alpha}{f\cos\alpha}\right); \text{ so that} \quad (7)$$

$$\begin{aligned}\frac{d\theta(\alpha)}{d\alpha} &= \frac{\frac{f\cos\alpha\cos\alpha + (R + f\sin\alpha)f\sin\alpha}{(f\cos\alpha)^2}}{1 + \left(\frac{R + f\sin\alpha}{f\cos\alpha}\right)^2} + \\ &\quad \frac{\frac{-f\cos\alpha\cos\alpha(R - f\sin\alpha)f\sin\alpha}{(f\cos\alpha)^2}}{1 + \left(\frac{R - f\sin\alpha}{f\cos\alpha}\right)^2} \\ &= \frac{f\cos\alpha\cos\alpha + (R + f\sin\alpha)f\sin\alpha}{(f\cos\alpha) + (R + f\sin\alpha)^2} + \\ &\quad \frac{-f\cos\alpha\cos\alpha(R - f\sin\alpha)f\sin\alpha}{(f\cos\alpha)^2 + (R - f\sin\alpha)^2} \\ &= \frac{f^2 + Rf\sin\alpha}{f^2 + R^2 + 2Rf\sin\alpha} + \frac{-f^2 + Rf\sin\alpha}{f^2 + R^2 - 2Rf\sin\alpha} = \\ &\quad \frac{2Rf\sin\alpha(R^2 - f^2)}{(f^2 + R^2 + 2Rf\sin\alpha)(f^2 + R^2 - 2Rf\sin\alpha)}\end{aligned} \quad (8)$$

In some aspects, R<f, so $$\frac{d\theta(\alpha)}{d\alpha} < 0.$$

Therefore, off-axis antennas such as the antenna 414 may be placed even closer than f for the sake of aperture. In some aspects, R=f, in which case the aperture is constant for all α.

In some aspects, each antenna 412 and 414 of the antenna array 408 associated with the transmitter network node 402 may have a directional beam pattern. In some aspects, the directional beam pattern may be electronically adjusted, but there may be a preferred direction where the transmission or reception power is the highest. In some aspects, one or more of the antennas may be oriented so that a transmission direction, or a reception direction, of the antenna may correspond to the center of the lens 410. In some aspects, this may be achieved by configuring the curved structure 416 to correspond to a portion of an inner surface of a sphere.

In some aspects, comatic aberration can impair the focus of signals from off-axis antennas 414. In some aspects, the lens 410 may be configured so as to compensate for a comatic aberration associated with incident signals. In some aspects, for example, a non-spherical lens 410 may be used to mitigate the comatic aberration.

As shown by reference number 426, the transmitter network node 402 may transmit, and the receiver network node 404 may receive, a first signal. The first signal may include a millimeter wave signal or a sub-Terahertz signal. The transmitter network node 402 may transmit the first signal using the antenna 412, and the receiver network node 404 may receive the first signal using a first antenna of an antenna array associated with the receiver network node 404. As shown by reference number 428, the transmitter network node 402 may transmit, and the receiver network node 404 may receive, a second signal. The second signal may include a millimeter wave signal or a sub-Terahertz signal. The transmitter network node 402 may transmit the second signal using the antenna 414, and the receiver network node 404 may receive the second signal using a second antenna of the antenna array associated with the receiver network node 404.

In some aspects, the transmitter network node 402 may transmit the first signal in a first direction and may transmit the second signal in a second direction that is different than the first direction. In some aspects, as described above, the first direction may correspond to a first maximum transmission power associated with the first antenna 412 and the second direction may correspond to a second maximum transmission power associated with the second antenna 414. For example, as described above, the transmitter network node 402 may transmit the first signal toward a center of the lens 410 and may transmit the second signal toward the center of the lens 410. In some aspects, for example, the curved structure 416 may correspond to a portion of an inner surface of a sphere.

As indicated above, FIG. 4 is provided as an example. Other examples may differ from what is described with regard to FIG. 4.

In some aspects, a lens of an antenna system may include an anti-reflective coating. The anti-reflective coating may include any anti-reflective coating suitable for use with RF lenses. In some aspects, a depth of the anti-reflective coating may be based at least in part on the angles at which the signals interact with the lens. In this way, signal loss due to the anti-reflective coating may be mitigated, while enhancing the anti-reflective property of the coating.

FIG. 5 is a diagram illustrating an example 500 associated with configuration of a depth of an anti-reflective coating applied to a lens 505 in an RF lens system, in accordance with the present disclosure. As shown, for example, a depth D of the anti-reflective coating 510 may be based at least in part on an incident angle $\theta_0$ associated with a signal 515. In some aspects, each antenna may have the same associated incident angle at the lens and, as a result, the depth D of the anti-reflective coating 510 may be uniform. Arranging the antennas that corresponds to the same incident angle may simplify the application of the anti-reflective coating 510, which may, in some aspects, reduce costs associated with applying the anti-reflective coating 510 and, therefore, reduce costs of implementation of aspects described herein.

In some cases, the antennas are arranged so that the incidental angles are different. In those cases, the depth D of the anti-reflective coating 510 may be adapted to the incident angle associated with each antenna. For example, due to refraction of the signal 515 through the anti-reflective coating 510, the optimal depth D of the anti-reflective coating 510 may be determined according to an equation for the round trip of a signal through the coating in a transmission direction and back in the opposite direction:

$$\frac{2D}{\cos(\theta_1)}[n_1 - n_0\sin(\theta_1)\sin(\theta_0)] = \frac{\lambda_0}{2}, \quad (9)$$

where $\theta_0$ is the incident angle of the signal 515 (e.g., with respect to a perpendicular axis 520 associated with a surface 525 of the anti-reflective coating 510, $\theta_1$ is the angle of refraction (e.g., the angle of the direction of the refracted signal 530 with respect to the perpendicular axis 520), n0 is the refractive index of the medium (e.g., the air) through which the signal 515 travels prior to interacting with the anti-reflective coating 510, n1 is the refractive index of the anti-reflective coating, ns is the refractive index of the medium (e.g., the material of the lens) through which the signal 515 travels after passing through the anti-reflective coating 510, and $\lambda_0$ is the incident wavelength of the signal 515. Thus, when $\theta_0=0$, the optimal depth $D=\lambda_1/4$, wherein $\lambda_1$ is the refracted wavelength. When $\theta_0 \neq 0$, the optimal depth D is dependent on $\theta_0$ and $D<\lambda_1/4$.

In this way, for example, the anti-reflective coating may be applied to the surface 525 of the lens such that the depth D of the anti-reflective coating differs from region to region on the surface 525 of the lens based at least in part on the orientation of the antennas. In some aspects, the transitions between depths may be gradual to minimize additional refractive artifacts.

As indicated above, FIG. 5 is provided as an example. Other examples may differ from what is described with regard to FIG. 5.

FIG. 6 is a diagram illustrating an example process 600 performed, for example, by a first network node, in accordance with the present disclosure. Example process 600 is an example where the first network node (e.g., transmitter network node 402) performs operations associated with an antenna array having a curved configuration.

As shown in FIG. 6, in some aspects, process 600 may include transmitting a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens (block 610). For example, the first network node (e.g., using communication manager 808 and/or transmission component 804, depicted in FIG. 8) may transmit a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens, as described above in connection with FIGS. 4 and 5. The first signal may include a millimeter wave signal or a sub-Terahertz signal.

As further shown in FIG. 6, in some aspects, process 600 may include transmitting a second signal using a second antenna of the plurality of antennas, wherein the second antenna is located at a second position on the curved structure so that the second signal has a second aperture with respect to the lens (block 620). For example, the first network node (e.g., using communication manager 808 and/or transmission component 804, depicted in FIG. 8) may transmit a second signal using a second antenna of the plurality of antennas, wherein the second antenna is located at a second position on the curved structure so that the second signal has a second aperture with respect to the lens, as described above in connection with FIGS. 4 and 5. The second signal may include a millimeter wave signal or a sub-Terahertz signal. In some aspects, the first signal and the second signal may both be millimeter wave signals. In some other aspects, the first signal and the second signal may both be sub-Terahertz signals. In some other aspects, one of the first and second signals may be a millimeter wave signal and the other of the first and second signals may be a sub-Terahertz signal.

Process 600 may include additional aspects, such as any single aspect or any combination of aspects described below and/or in connection with one or more other processes described elsewhere herein.

In a first aspect, the second aperture is smaller than the first aperture. In a second aspect, alone or in combination with the first aspect, the curved structure corresponds to a portion of a circle. In a third aspect, alone or in combination with the second aspect, a radius of the lens is less than a radius of the circle. In a fourth aspect, alone or in combination with the second aspect, a radius of the lens is equal to a radius of the circle. In a fifth aspect, alone or in combination with the fourth aspect, the first aperture is equal to the second aperture.

In a sixth aspect, alone or in combination with one or more of the first through fifth aspects, transmitting the first signal comprises transmitting the first signal in a first direction, and transmitting the second signal comprises transmitting the second signal in a second direction that is different than the first direction. In a seventh aspect, alone or in combination with the sixth aspect, the first direction corresponds to a first maximum transmission power associated with the first antenna, and the second direction corresponds to a second maximum transmission power associated with the second antenna. In an eighth aspect, alone or in combination with one or more of the sixth or seventh aspects, transmitting the first signal in the first direction comprises transmitting the first signal toward a center of the lens, and transmitting the second signal in the second direction comprises transmitting the second signal toward the center of the lens. In a ninth aspect, alone or in combination with the eighth aspect, the curved structure corresponds to a portion of an inner surface of a sphere.

In a tenth aspect, alone or in combination with one or more of the sixth through ninth aspects, the at least one lens includes an anti-reflective coating disposed on a surface of the at least one lens, and a depth of the anti-reflective coating is based at least in part on at least one of the first direction or the second direction. In an eleventh aspect, alone or in combination with the tenth aspect, an incident angle associated with an intersection of the first signal with the surface of the lens is equal to an incident angle associated with an intersection of the second signal with the surface of the lens, and the depth of the anti-reflective coating is uniform across the surface of the lens. In a twelfth aspect, alone or in combination with one or more of the tenth or eleventh aspects, the depth equals one quarter of a wavelength, of the first signal, based at least in part on an incident angle associated with an intersection of the first signal with the surface of the lens being equal to zero. In a thirteenth aspect, alone or in combination with one or more of the tenth or eleventh aspects, the depth equals less than one quarter of a wavelength of the first signal based at least in part on an incident angle associated with an intersection of the first signal with the surface of the lens being not equal to zero.

In a fourteenth aspect, alone or in combination with one or more of the first through thirteenth aspects, the lens is configured so as to compensate for a comatic aberration associated with at least one of the first signal or the second signal. In a fifteenth aspect, alone or in combination with the fourteenth aspect, the lens comprises a non-spherical lens.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
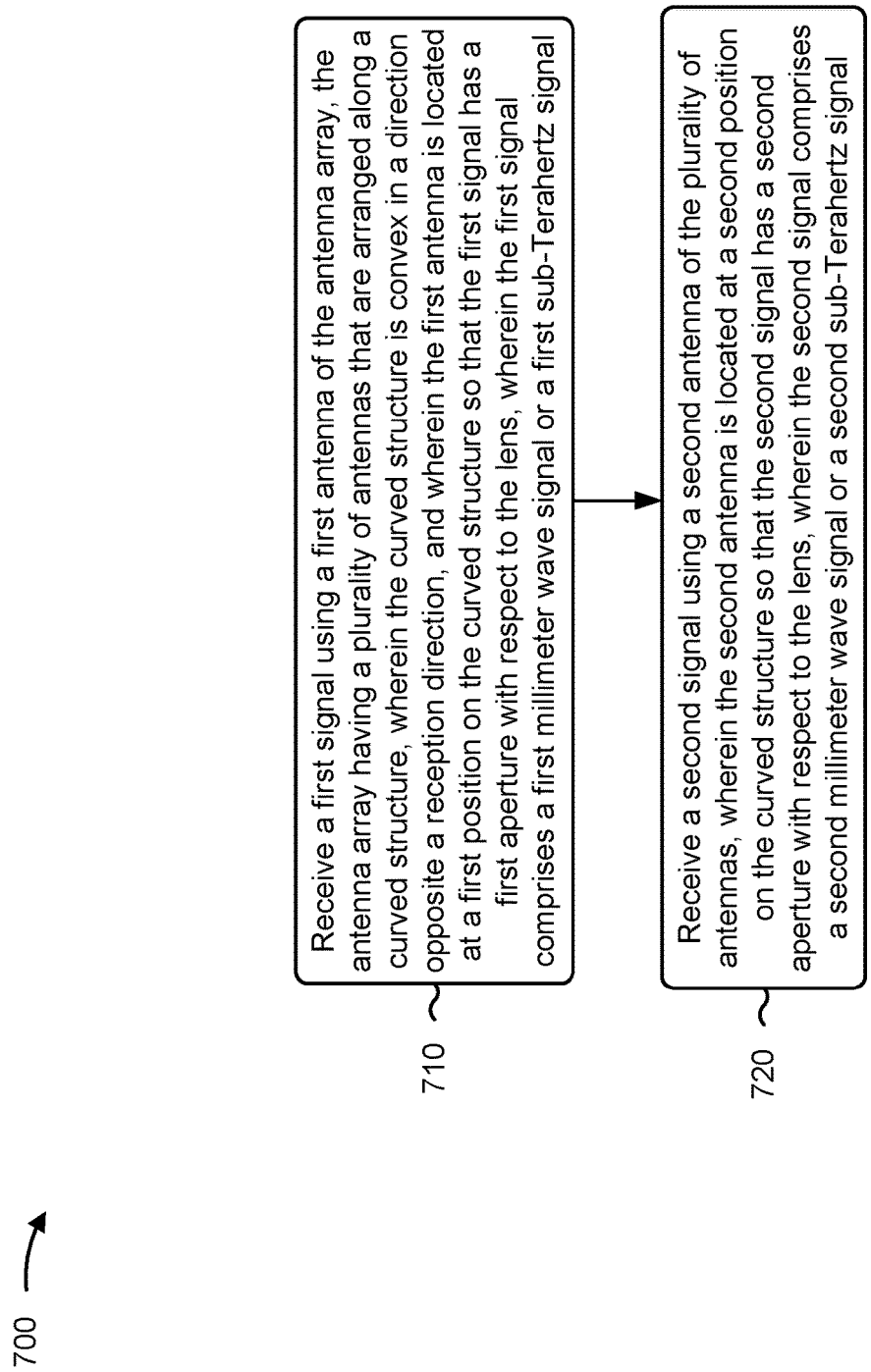

FIG. 7 is a diagram illustrating an example process 700 performed, for example, by a first network node, in accordance with the present disclosure. Example process 700 is an example where the first network node (e.g., receiver network node 404) performs operations associated with an antenna array having a curved configuration.

As shown in FIG. 7, in some aspects, process 700 may include receiving a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens (block 710). For example, the first network node (e.g., using communication manager 808 and/or reception component 802, depicted in FIG. 8) may receive a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens, as described above. The first signal may include a millimeter wave signal or a sub-Terahertz signal.

As further shown in FIG. 7, in some aspects, process 700 may include receiving a second signal using a second antenna of the plurality of antennas, wherein the second antenna is located at a second position on the curved structure so that the second signal has a second aperture with respect to the lens (block 720). For example, the first network node (e.g., using communication manager 808 and/or reception component 802, depicted in FIG. 8) may receive a second signal using a second antenna of the plurality of antennas, wherein the second antenna is located at a second position on the curved structure so that the second signal has a second aperture with respect to the lens, as described above. The second signal may include a millimeter wave signal or a sub-Terahertz signal. In some aspects, the first signal and the second signal may both be millimeter wave signals. In some other aspects, the first signal and the second signal may both be sub-Terahertz signals. In some other aspects, one of the first and second signals may be a millimeter wave signal and the other of the first and second signals may be a sub-Terahertz signal.

Process 700 may include additional aspects, such as any single aspect or any combination of aspects described below and/or in connection with one or more other processes described elsewhere herein.

In a first aspect, the second aperture is smaller than the first aperture. In a second aspect, alone or in combination with the first aspect, the curved structure corresponds to a portion of a circle. In a third aspect, alone or in combination with the second aspect, a radius of the lens is less than a radius of the circle. In a fourth aspect, alone or in combination with the second aspect, a radius of the lens is equal to a radius of the circle. In a fifth aspect, alone or in combination with the fourth aspect, the first aperture is equal to the second aperture.

In a sixth aspect, alone or in combination with one or more of the first through fifth aspects, receiving the first signal comprises receiving the first signal from a first direction, and receiving the second signal comprises receiving the second signal from a second direction that is different than the first direction. In a seventh aspect, alone or in combination with one or more of the first through sixth aspects, the first antenna is oriented such that a first axis of communication corresponding to the first antenna is directed toward a center of the lens, and the second antenna is oriented such that a second axis of communication corresponding to the second antenna is directed toward the center of the lens. In an eighth aspect, alone or in combination with the seventh aspect, the curved structure corresponds to a portion of an inner surface of a sphere.

In a ninth aspect, alone or in combination with one or more of the sixth through eighth aspects, the at least one lens includes an anti-reflective coating disposed on a surface of the at least one lens, and a depth of the anti-reflective coating is based at least in part on at least one of the first direction or the second direction. In a tenth aspect, alone or in combination with the ninth aspect, an incident angle associated with an intersection of the first signal with the surface of the lens is equal to an incident angle associated with an intersection of the second signal with the surface of the lens, and the depth of the anti-reflective coating is uniform across the surface of the lens. In an eleventh aspect, alone or in combination with one or more of the ninth or tenth aspects, the depth equals one quarter of a wavelength, of the first signal, based at least in part on an incident angle associated with an intersection of the first signal with the surface of the lens being equal to zero. In a twelfth aspect, alone or in combination with one or more of the ninth or tenth aspects, the depth equals less than one quarter of a wavelength of the first signal based at least in part on an incident angle associated with an intersection of the first signal with the surface of the lens being not equal to zero.

In a thirteenth aspect, alone or in combination with one or more of the first through twelfth aspects, the lens is configured so as to compensate for a comatic aberration associated with at least one of the first signal or the second signal. In a fourteenth aspect, alone or in combination with the thirteenth aspect, the lens comprises a non-spherical lens.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
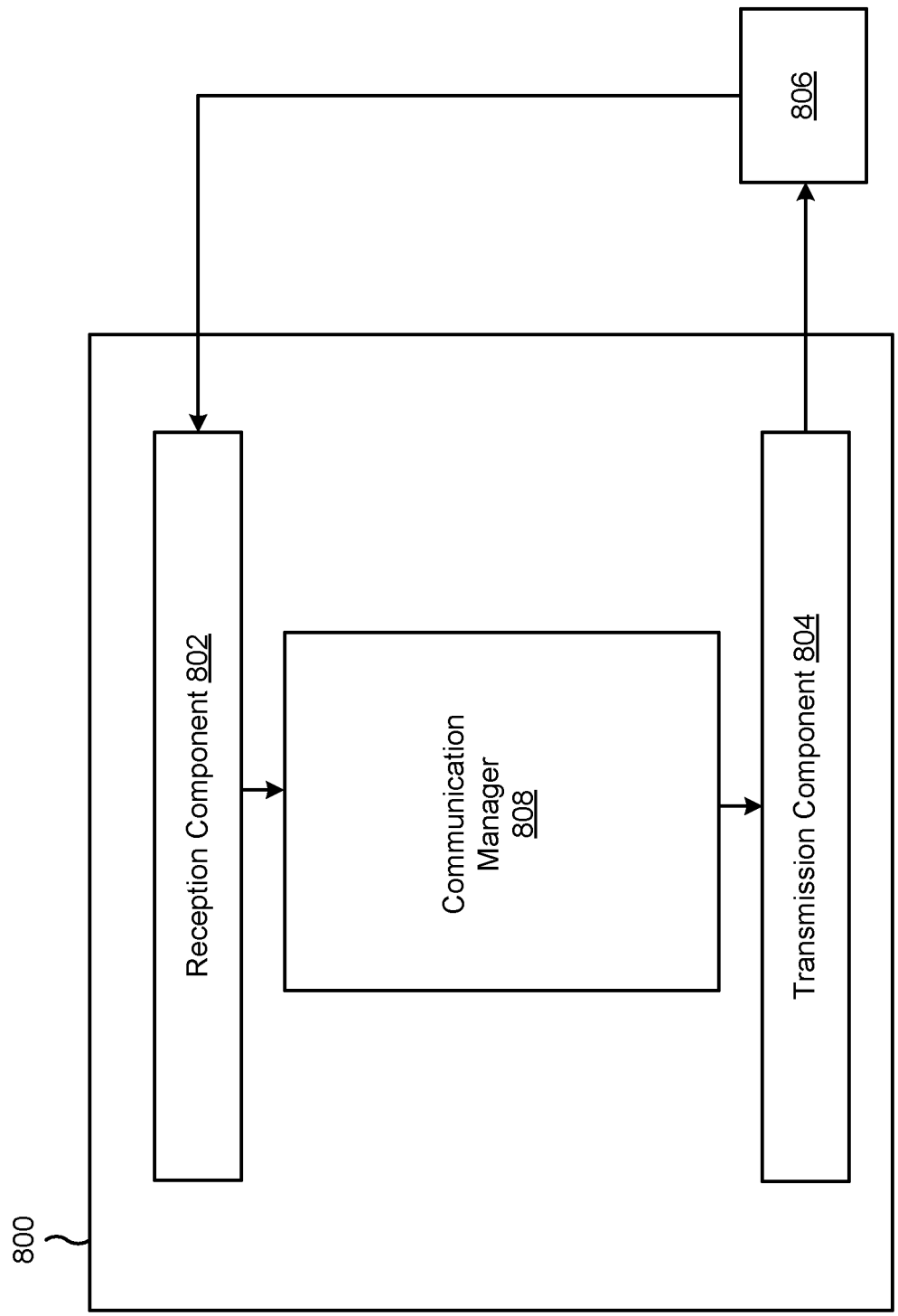
FIG. 8 is a diagram of an example apparatus for wireless communication, in accordance with the present disclosure.

FIG. 8 is a diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIGS. 4 and 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE or the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE or the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE or the base station described in connection with FIG. 2. In some aspects, the transmission component 804 may be co-located with the reception component 802 in a transceiver.

The communication manager 808 and/or the transmission component 804 may transmit a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens. The communication manager 808 and/or the transmission component 804 may transmit a second signal using a second antenna of the plurality of antennas, wherein the second antenna is located at a second position on the curved structure so that the second signal has a second aperture with respect to the lens. In some aspects, the first signal and the second signal may both be millimeter wave signals. In some other aspects, the first signal and the second signal may both be sub-Terahertz signals. In some other aspects, one of the first and second signals may be a millimeter wave signal and the other of the first and second signals may be a sub-Terahertz signal. In some aspects, the communication manager 808 may include one or more antennas, a modem, a controller/processor, a memory, or a combination thereof, of the UE or the base station described in connection with FIG. 2. In some aspects, the communication manager 808 may be, be similar to, include, or be included in, the communication manager 140 and/or the communication manager 150 depicted in FIGS. 1 and 2. In some aspects, the communication manager 808 may include the reception component 802 and/or the transmission component 804.

The communication manager 808 and/or the reception component 802 may receive a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens. The communication manager 808 and/or the reception component 802 may receive a second signal using a second antenna of the plurality of antennas, wherein the second antenna is located at a second position on the curved structure so that the second signal has a second aperture with respect to the lens.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a first network node having an antenna system that includes an antenna array and at least one lens, comprising: transmitting a first signal using a first antenna of the antenna array, the antenna array having a plurality of antennas that are arranged along a curved structure, wherein the curved structure is convex in a direction opposite a transmission direction, and wherein the first antenna is located at a first position on the curved structure so that the first signal has a first aperture with respect to the lens, wherein the first signal comprises a first millimeter wave signal or a first sub-Terahertz signal; and transmitting a second signal using a second antenna of the plurality of antennas, wherein the second antenna is located at a second position on the curved structure so that the second signal has a second aperture with respect to the lens, wherein the first signal comprises a first millimeter wave signal or a first sub-Terahertz signal.

Aspect 2: The method of Aspect 1, wherein the second aperture is smaller than the first aperture.

Aspect 3: The method of either of Aspects 1 or 2, wherein the curved structure corresponds to a portion of a circle.

Aspect 4: The method of Aspect 3, wherein a radius of the lens is less than a radius of the circle.

Aspect 5: The method of Aspect 3, wherein a radius of the lens is equal to a radius of the circle.

Aspect 6: The method of Aspect 5, wherein the first aperture is equal to the second aperture.

Aspect 7: The method of any of Aspects 1-6, wherein transmitting the first signal comprises transmitting the first signal in a first direction, and wherein transmitting the second signal comprises transmitting the second signal in a second direction that is different than the first direction.

Aspect 8: The method of Aspect 7, wherein the first direction corresponds to a first maximum transmission power associated with the first antenna, and wherein the second direction corresponds to a second maximum transmission power associated with the second antenna.

Aspect 9: The method of either of Aspects 7 or 8, wherein transmitting the first signal in the first direction comprises transmitting the first signal toward a center of the lens, and wherein transmitting the second signal in the second direction comprises transmitting the second signal toward the center of the lens.

Aspect 10: The method of Aspect 9, wherein the curved structure corresponds to a portion of an inner surface of a sphere.

Aspect 11: The method of any of Aspects 7-10, wherein the at least one lens includes an anti-reflective coating disposed on a surface of the at least one lens, and wherein a depth of the anti-reflective coating is based at least in part on at least one of the first direction or the second direction.

Aspect 12: The method of Aspect 11, wherein an incident angle associated with an intersection of the first signal with the surface of the lens is equal to an incident angle associated with an intersection of the second signal with the surface of the lens, and wherein the depth of the anti-reflective coating is uniform across the surface of the lens.

Aspect 13: The method of either of Aspects 11 or 12, wherein the depth equals one quarter of a wavelength, of the first signal, based at least in part on an incident angle associated with an intersection of the first signal with the surface of the lens being equal to zero.

Aspect 14: The method of either of Aspects 11 or 12, wherein the depth equals less than one quarter of a wavelength of the first signal based at least in part on an incident angle associated with an intersection of the first signal with the surface of the lens being not equal to zero.

Aspect 15: The method of any of Aspects 1-14, wherein the lens is configured so as to compensate for a comatic aberration associated with at least one of the first signal or the second signal.

Aspect 16: The method of Aspect 15, wherein the lens comprises a non-spherical lens.

Aspect 17: A method of wireless communication performed by a first network node having an antenna system that includes an antenna array and at least one lens, comprising: receiving a first signal using a first antenna of the antenna array, the antenna array having a plurality of antennas that are arranged along a curved structure, wherein the curved structure is convex in a direction opposite a reception direction, and wherein the first antenna is located at a first position on the curved structure so that the first signal has a first aperture with respect to the lens, wherein the first signal comprises a first millimeter wave signal or a first sub-Terahertz signal; and receiving a second signal using a second antenna of the plurality of antennas, wherein the second antenna is located at a second position on the curved structure so that the second signal has a second aperture with respect to the lens, wherein the second signal comprises a second millimeter wave signal or a second sub-Terahertz signal.

Aspect 18: The method of Aspect 17, wherein the second aperture is smaller than the first aperture.

Aspect 19: The method of either of Aspects 17 or 18, wherein the curved structure corresponds to a portion of a circle.

Aspect 20: The method of Aspect 19, wherein a radius of the lens is less than a radius of the circle.

Aspect 21: The method of Aspect 19, wherein a radius of the lens is equal to a radius of the circle.

Aspect 22: The method of Aspect 21, wherein the first aperture is equal to the second aperture.

Aspect 23: The method of any of Aspects 17-22, wherein receiving the first signal comprises receiving the first signal from a first direction, and wherein receiving the second signal comprises receiving the second signal from a second direction that is different than the first direction.

Aspect 24: The method of any of Aspects 17-23, wherein the first antenna is oriented such that a first axis of communication corresponding to the first antenna is directed toward a center of the lens, and wherein the second antenna is oriented such that a second axis of communication corresponding to the second antenna is directed toward the center of the lens.

Aspect 25: The method of Aspect 24, wherein the curved structure corresponds to a portion of an inner surface of a sphere.

Aspect 26: The method of any of Aspects 23-25, wherein the at least one lens includes an anti-reflective coating disposed on a surface of the at least one lens, and wherein a depth of the anti-reflective coating is based at least in part on at least one of the first direction or the second direction.

Aspect 27: The method of Aspect 26, wherein an incident angle associated with an intersection of the first signal with the surface of the lens is equal to an incident angle associated with an intersection of the second signal with the surface of the lens, and wherein the depth of the anti-reflective coating is uniform across the surface of the lens.

Aspect 28: The method of either of Aspects 26 or 27, wherein the depth equals one quarter of a wavelength, of the first signal, based at least in part on an incident angle associated with an intersection of the first signal with the surface of the lens being equal to zero.

Aspect 29: The method of either of Aspects 26 or 27, wherein the depth equals less than one quarter of a wavelength of the first signal based at least in part on an incident angle associated with an intersection of the first signal with the surface of the lens being not equal to zero.

Aspect 30: The method of any of Aspects 17-29, wherein the lens is configured so as to compensate for a comatic aberration associated with at least one of the first signal or the second signal.

Aspect 31: The method of Aspect 30, wherein the lens comprises a non-spherical lens.

Aspect 32: An apparatus for wireless communication at a device, comprising a processor; memory coupled with the processor; and instructions stored in the memory and executable by the processor to cause the apparatus to perform the method of one or more of Aspects 1-16.

Aspect 33: A device for wireless communication, comprising a memory and one or more processors coupled to the memory, the one or more processors configured to perform the method of one or more of Aspects 1-16.

Aspect 34: An apparatus for wireless communication, comprising at least one means for performing the method of one or more of Aspects 1-16.

Aspect 35: A non-transitory computer-readable medium storing code for wireless communication, the code comprising instructions executable by a processor to perform the method of one or more of Aspects 1-16.

Aspect 36: A non-transitory computer-readable medium storing a set of instructions for wireless communication, the set of instructions comprising one or more instructions that, when executed by one or more processors of a device, cause the device to perform the method of one or more of Aspects 1-16.

Aspect 37: An apparatus for wireless communication at a device, comprising a processor; memory coupled with the processor; and instructions stored in the memory and executable by the processor to cause the apparatus to perform the method of one or more of Aspects 17-31.

Aspect 38: A device for wireless communication, comprising a memory and one or more processors coupled to the memory, the one or more processors configured to perform the method of one or more of Aspects 17-31.

Aspect 39: An apparatus for wireless communication, comprising at least one means for performing the method of one or more of Aspects 17-31.

Aspect 40: A non-transitory computer-readable medium storing code for wireless communication, the code comprising instructions executable by a processor to perform the method of one or more of Aspects 17-31.

Aspect 41: A non-transitory computer-readable medium storing a set of instructions for wireless communication, the set of instructions comprising one or more instructions that, when executed by one or more processors of a device, cause the device to perform the method of one or more of Aspects 17-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first network node, comprising:
   an antenna system including an antenna array and at least one lens, the antenna array having a plurality of antennas on a curved structure, each of the plurality of antennas being arranged at one of a plurality of different positions along the curved structure, wherein the curved structure is convex in a direction opposite a transmission direction;
   a memory; and
   one or more processors, coupled to the memory and the antenna system, configured to:
   transmit a first signal using a first antenna of the antenna array, wherein the first antenna is located at a first position on the curved structure so that the first signal has a first aperture with respect to the lens, wherein the first signal comprises a first millimeter wave signal or a first sub-Terahertz signal; and
   transmit a second signal using a second antenna of the plurality of antennas, wherein the second antenna is located at a second position on the curved structure so that the second signal has a second aperture with respect to the lens, wherein the second signal comprises a second millimeter wave signal or a second sub-Terahertz signal.

2. The first network node of claim 1, wherein the second aperture of the second signal transmitted using the second antenna is smaller than the first aperture of the first signal transmitted using the first antenna.

3. The first network node of claim 1, wherein the curved structure corresponds to a portion of a circle.

4. The first network node of claim 3, wherein a radius of the lens is less than a radius of the circle corresponding to the curved structure on which the plurality of antennas are arranged.

5. The first network node of claim 3, wherein a radius of the lens is equal to a radius of the circle corresponding to the curved structure on which the plurality of antennas are arranged.

6. The first network node of claim 5, wherein the first aperture is equal to the second aperture.

7. The first network node of claim 1, wherein the one or more processors, to transmit the first signal, are configured to transmit the first signal in a first direction, and wherein the one or more processors, to transmit the second signal are configured to transmit the second signal in a second direction that is different than the first direction.

8. The first network node of claim 7, wherein the first direction corresponds to a first maximum transmission power associated with the first antenna, and wherein the second direction corresponds to a second maximum transmission power associated with the second antenna.

9. The first network node of claim 7, wherein the one or more processors, to transmit the first signal in the first direction, are configured to transmit the first signal toward a center of the lens, and wherein the one or more processors, to transmit the second signal in the second direction, are configured to transmit the second signal toward the center of the lens.

10. The first network node of claim 9, wherein the curved structure on which the plurality of antennas are arranged corresponds to a portion of an inner surface of a sphere.

11. The first network node of claim 7, wherein the at least one lens includes an anti-reflective coating disposed on a surface of the at least one lens, and wherein a depth of the anti-reflective coating is based at least in part on at least one of the first direction or the second direction.

12. The first network node of claim 11, wherein an incident angle associated with an intersection of the first signal with the surface of the lens is equal to an incident angle associated with an intersection of the second signal with the surface of the lens, and wherein the depth of the anti-reflective coating is uniform across the surface of the lens.

13. The first network node of claim 11, wherein the depth equals one quarter of a wavelength, of the first signal, based at least in part on an incident angle associated with an intersection of the first signal with the surface of the lens being equal to zero.

14. The first network node of claim 11, wherein the depth equals less than one quarter of a wavelength of the first signal based at least in part on an incident angle associated with an intersection of the first signal with the surface of the lens being not equal to zero.

15. The first network node of claim 1, wherein the lens is configured so as to compensate for a comatic aberration associated with at least one of the first signal or the second signal.

16. The first network node of claim 15, wherein the lens comprises a non-spherical lens.

17. A first network node, comprising:
an antenna system including an antenna array and at least one lens, the antenna array having a plurality of antennas on a curved structure, each of the plurality of antennas being arranged at one of a plurality of different positions along the curved structure, wherein the curved structure is convex in a direction opposite a transmission direction;
a memory; and
one or more processors, coupled to the memory and the antenna system, configured to:
receive a first signal using a first antenna of the antenna array, wherein the first antenna is located at a first position on the curved structure so that the first signal has a first aperture with respect to the lens, wherein the first signal comprises a first millimeter wave signal or a first sub-Terahertz signal; and
receive a second signal using a second antenna of the plurality of antennas, wherein the second antenna is located at a second position on the curved structure so that the second signal has a second aperture with respect to the lens, wherein the second signal comprises a second millimeter wave signal or a second sub-Terahertz signal.

18. The first network node of claim 17, wherein the curved structure corresponds to a portion of a circle.

19. The first network node of claim 18, wherein a radius of the lens is equal to a radius of the circle corresponding to the curved structure on which the plurality of antennas are arranged.

20. The first network node of claim 17, wherein the one or more processors, to receive the first signal, are configured to receive the first signal from a first direction, and wherein the one or more processors, to receive the second signal, are configured to receive the second signal from a second direction that is different than the first direction.

21. The first network node of claim 20, wherein the first antenna is oriented such that a first axis of communication corresponding to the first antenna is directed toward a center of the lens, and wherein the second antenna is oriented such that a second axis of communication corresponding to the second antenna is directed toward the center of the lens.

22. The first network node of claim 20, wherein the at least one lens includes an anti-reflective coating disposed on a surface of the at least one lens, and wherein a depth of the anti-reflective coating is based at least in part on at least one of the first direction or the second direction.

23. The first network node of claim 22, wherein an incident angle associated with an intersection of the first signal with the surface of the lens is equal to an incident angle associated with an intersection of the second signal with the surface of the lens, and wherein the depth of the anti-reflective coating is uniform across the surface of the lens.

24. The first network node of claim 22, wherein the depth equals one quarter of a wavelength, of the first signal, based at least in part on an incident angle associated with an intersection of the first signal with the surface of the lens being equal to zero.

25. The first network node of claim 22, wherein the depth equals less than one quarter of a wavelength of the first signal based at least in part on an incident angle associated with an intersection of the first signal with the surface of the lens being not equal to zero.

26. The first network node of claim 17, wherein the lens is configured so as to compensate for a comatic aberration associated with at least one of the first signal or the second signal.

27. A method of wireless communication performed by a first network node having an antenna system that includes an antenna array and at least one lens, comprising:

transmitting a first signal using a first antenna of the antenna array, the antenna array having a plurality of antennas on a curved structure, each of the plurality of antennas being arranged at one of a plurality of different positions along the curved structure, wherein the curved structure is convex in a direction opposite a transmission direction, and wherein the first antenna is located at a first position on the curved structure so that the first signal has a first aperture with respect to the lens, wherein the first signal comprises a first millimeter wave signal or a first sub-Terahertz signal; and transmitting a second signal using a second antenna of the plurality of antennas, wherein the second antenna is located at a second position on the curved structure so that the second signal has a second aperture with respect to the lens, wherein the second signal comprises a second millimeter wave signal or a second sub-Terahertz signal.

28. The method of claim 27, wherein transmitting the first signal comprises transmitting the first signal in a first direction, and wherein transmitting the second signal comprises transmitting the second signal in a second direction that is different than the first direction.

29. A method of wireless communication performed by a first network node having an antenna system that includes an antenna array and at least one lens, comprising:

receiving a first signal using a first antenna of the antenna array, the antenna array having a plurality of antennas on a curved structure, each of the plurality of antennas being arranged at one of a plurality of different positions along the curved structure, wherein the curved structure is convex in a direction opposite a transmission direction, and wherein the first antenna is located at a first position on the curved structure so that the first signal has a first aperture with respect to the lens, wherein the first signal comprises a first millimeter wave signal or a first sub-Terahertz signal; and receiving a second signal using a second antenna of the plurality of antennas, wherein the second antenna is located at a second position on the curved structure so that the second signal has a second aperture with respect to the lens, wherein the second signal comprises a second millimeter wave signal or a second sub-Terahertz signal.

30. The method of claim 29, wherein receiving the first signal comprises receiving the first signal from a first direction, and wherein receiving the second signal comprises receiving the second signal from a second direction that is different than the first direction.

* * * * *